(12) United States Patent
Knapp et al.

(10) Patent No.: US 10,874,208 B1
(45) Date of Patent: Dec. 29, 2020

(54) ADJUSTABLE LAPTOP MOUNT

(71) Applicant: CKnapp Sales, Inc., Goodfield, IL (US)

(72) Inventors: Chance Knapp, Goodfield, IL (US); Brandon Meyer, Normal, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 0 days.

(21) Appl. No.: 16/661,107

(22) Filed: Oct. 23, 2019

Related U.S. Application Data

(63) Continuation-in-part of application No. 29/700,365, filed on Aug. 1, 2019.

(51) Int. Cl.
*A47B 97/04* (2006.01)
*A47B 23/06* (2006.01)
(Continued)

(52) U.S. Cl.
CPC ............ *A47B 23/06* (2013.01); *A47B 23/043* (2013.01); *A63B 21/4035* (2015.10);
(Continued)

(58) Field of Classification Search
CPC ........ F16M 11/24; F16M 11/38; A47B 23/06; A47B 23/043; A63B 21/4035; A63B 22/02
USPC ...... 248/447.1, 447.2, 441.1, 447, 448, 449, 248/122.1, 124.1, 157, 419, 176.3, 248/220.21, 220.22, 313; 482/54
See application file for complete search history.

(56) References Cited

U.S. PATENT DOCUMENTS 6,045,179 A * 4/2000 Harrison .................. A47C 7/70
248/447.1
7,335,147 B2 * 2/2008 Jones ................. A63B 71/0622
482/148
(Continued)

OTHER PUBLICATIONS

VIVO, "VIVO Single Laptop Notebook Desk Mount Stand—Fully Adjustable Extension with C Clamp (STAND-V001L)," retrieved from https://www.amazon.com/VIVO-Single-Laptop-Notebook-Mount/dp/B00CM9NG1W, on Oct. 22, 2019, 8 pages.
(Continued)

*Primary Examiner* — Todd M Epps
(74) *Attorney, Agent, or Firm* — Hanley, Flight & Zimmerman, LLC

(57) ABSTRACT

Methods, apparatus, systems and articles of manufacture are disclosed. An example adjustable laptop mount includes: a first segment having a first end and a second end; a second segment having a first end and a second end; a third segment having a first end and a second end, the first end of the third segment to at least partially overlap the second end of the first segment and the second end of the third segment to at least partially overlap the first end of the second segment; a first attachment mechanism at the first end of the first segment to removably affix the first segment to a first furniture element; a second attachment mechanism at the second end of the second segment to removably affix the second segment to a second furniture element; a fourth segment having a first end and a second end, the second end of the fourth segment to attach to a tray; and a clamp at the third segment to removably affix the fourth segment to the third segment.

20 Claims, 13 Drawing Sheets

(51) Int. Cl.
*A47B 23/04* (2006.01)
*F16M 11/24* (2006.01)
*F16M 11/38* (2006.01)
*A63B 22/02* (2006.01)
*A63B 21/00* (2006.01)
*A63B 71/06* (2006.01)

(52) U.S. Cl.
CPC .......... *A63B 22/02* (2013.01); *A63B 71/0622* (2013.01); *F16M 11/24* (2013.01); *F16M 11/38* (2013.01); *A47B 2023/049* (2013.01); *A63B 2071/0658* (2013.01); *A63B 2225/685* (2013.01)

(56) References Cited

U.S. PATENT DOCUMENTS

| | | | | |
|---|---|---|---|---|
| 7,686,742 | B2* | 3/2010 | Tischler | A63B 71/00 |
| | | | | 482/57 |
| 7,887,021 | B2* | 2/2011 | Shevin-Sandy | F16M 13/02 |
| | | | | 248/447.1 |
| 7,946,542 | B1 | 5/2011 | Chapman | |
| 8,561,863 | B2* | 10/2013 | LaColla | B60R 11/02 |
| | | | | 224/275 |
| 8,734,302 | B2 | 5/2014 | Hsieh | |
| 9,010,714 | B2* | 4/2015 | Weldon | F16M 13/022 |
| | | | | 248/448 |
| 2005/0148440 | A1* | 7/2005 | Denton | A63B 71/0622 |
| | | | | 482/54 |
| 2006/0258513 | A1 | 11/2006 | Routley et al. | |
| 2012/0088633 | A1* | 4/2012 | Crafton | A63B 23/0464 |
| | | | | 482/1 |
| 2013/0116092 | A1* | 5/2013 | Martinez | A63B 24/0062 |
| | | | | 482/9 |
| 2019/0038018 | A1* | 2/2019 | Hill | F16M 11/046 |
| 2020/0170404 | A1* | 6/2020 | Knapp | A47B 9/04 |

OTHER PUBLICATIONS

VIVO, "VIVO Single Monitor Desk Mount Stand and Laptop Tray Holder with Height Adjustable Deluxe Pneumatic Arm for 1 Screen up to 27 inches or Laptops/Notebooks 10 to 15 inches (STAND-V001BL)," retrieved from https://www.amazon.com/VIVO-Monitor-Adjustable-Notebooks-STAND-V001BL/dp/B01A165MQE/, on Oct. 22, 2019, 1 pages.

Tread Experience, "Treadmill Desk Workstation for Laptop iPad Tablet iPhone Standing Stand Board and Book Holder Great for Running Walking Working and Exercise Workout in Office and Home," retrieved from https://www.amazon.com/Treadmill-Workstation-Standing-Running-Exercise/dp/B06XZD9WX2/, on Oct. 22, 2019, 6 pages.

Walktop, "Walktop Treadmill Desk," retrieved from https://www.amazon.com/Walktop-FF90015-Treadmill-Desk/dp/B00TKXLEI0/, on Oct. 22, 2019, 8 pages.

Dr. McBabe's Fitness Products, "Treadmill Desk," retrieved from https://www.amazon.com/Dr-McBabes-Fitness-Products-T1/dp/B01DJW0QRM/, on Oct. 22, 2019, 7 pages.

Surfshelf, "SurfShelf Treadmill Desk: Laptop and iPad Holder," retrieved from https://www.amazon.com/SurfShelf-Treadmill-Desk-Laptop-Holder/dp/B001M04RBK, on Oct. 22, 2019, 7 pages.

* cited by examiner

ADJUSTABLE LAPTOP MOUNT

RELATED APPLICATION

This patent arises from a continuation of U.S. patent application Ser. No. 29/700,365, (Now U.S. Pat. No. D901513) which was filed on Aug. 1, 2019. U.S. patent application Ser. No. 29/700,365 is hereby incorporated herein by reference in its entirety. Priority to U.S. patent application Ser. No. 29/700,365 is hereby claimed.

FIELD OF THE DISCLOSURE

This disclosure relates generally to an adjustable laptop mount, and, more particularly, to an adjustable laptop mount apparatus and associated methods of manufacture.

BACKGROUND

The statements in this section merely provide background information related to the disclosure and may not constitute prior art.

Portable workstations enable users to do work on laptops, for example, while using exercise equipment (e.g., a treadmill (e.g., running, walking, etc.), an elliptical, etc.), vehicles, etc. Portable workstations can be adjustable to suit particular environments, equipment, etc. For example, portable workstations can be set on, strapped to, and/or otherwise positioned on one treadmill handle, both treadmill handles, the treadmill screen, etc. Use of a portable workstation can provide ergonomic, increased productivity, and/or other health benefits to the user.

Portable workstations encourage productivity and health benefits to users beyond typical desks or tables. A portable workstation mounted to a treadmill enables a user to be physically active while simultaneously working on a device (e.g., laptop, tablet, etc.). Additionally or alternatively, a portable workstation allows users to view media (e.g., television shows, movies, etc.) on a portable device while using equipment such as a treadmill.

Portable workstations, however, are not customizable and are often not conveniently transported. This impairs a user's desire to use a portable workstation (e.g., bring one to the gym) due to incompatibility with equipment, inconvenient positioning, or excessive size and/or weight for transport. In some cases, a device may be unable to fit the equipment, rendering the laptop mount unusable.

Figure 1:
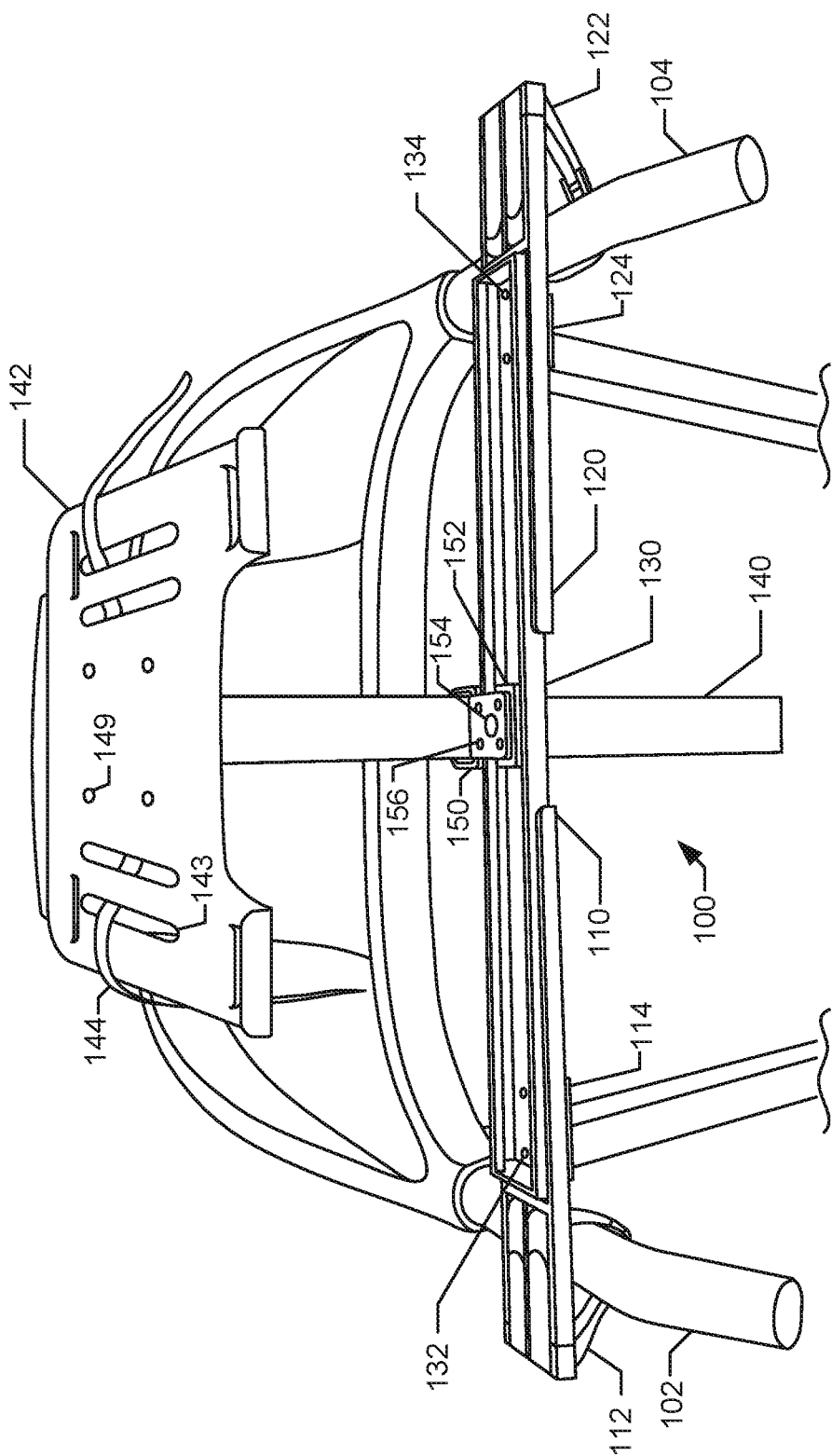
FIG. 1 illustrates an example adjustable laptop mount.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

Certain examples provide an adjustable laptop mount. Certain examples provide an adjustable laptop mount designed to strap on and/or to otherwise attach to a furniture element such as the handles of a treadmill. The laptop mount is adjustable in length, for example, to fit many different treadmill sizes by adjusting to fit a width of the treadmill's handles. In certain examples, the laptop mount includes one or more adjustable straps that can tighten around each handle of the treadmill to secure the laptop mount to the treadmill handles. The laptop mount can also be adjustable in height to accommodate different treadmill heights and/or user heights. The laptop mount can be adjustable in horizontal positioning to accommodate user preference.

A large number of laptop mounts currently available do not provide width adjustment of a base, vertical and/or horizontal adjustment of a laptop, etc. As a result, users are limited to laptop mounts and/or portable workstations that are only compatible with their specific treadmill. That is, such laptop mounts must have the correct width within a small tolerance interval and/or attachment type (e.g., clamp compatible with handle shape/size) to properly attach to the treadmill. Additionally, users often cannot adjust the height and/or horizontal position of the laptop itself, limiting ergonomic use.

To remedy these many deficiencies, certain examples provide a laptop mount which, by using straps combined with a telescopic design, is able to fit a plurality of different treadmills and/or other equipment. A telescopic base increases a range of handle widths with which the laptop mount is compatible. Additionally, an adjustable height and horizontal positioning of the laptop increases ergonomic use. Further, portability of the laptop mount increases, allowing for improved transportation.

In certain examples, a main laptop mount can be constructed using formed metal plates, by using a metal bar inserted into metal tubing, or by using metal tubing inserted into metal tubing of a larger size (e.g., larger diameter, etc.), for example. In certain examples, the adjustable laptop mount base is telescopic, allowing the base to extend to different widths to fit treadmills of many different sizes. The width of the adjustable laptop mount can be secured by inserting bolts, screws, pins, etc., into aligned slots placed along the length of the base of the laptop mount. Straps, ties, etc., are attached to each end of the adjustable laptop mount base, allowing the laptop mount to be secured to handles of various shapes and/or sizes of a treadmill. In some examples, the straps include and/or made from a hook and loop closure such as VELCRO™.

FIG. 1 illustrates an example adjustable laptop mount 100 positioned with respect to first and second furniture elements, such as handles and/or sides 102, 104 of exercise equipment (e.g., a treadmill, stair climber, etc.), vehicles, etc. In certain examples, the handles 102, 104 are part of an exercise equipment arm. The example adjustable laptop mount 100 includes a base including a first segment 110, a second segment 120, and a third segment 130. The example first segment 110, second segment 120, and third segment 130 can be formed of any suitable metal (e.g., cold roll steel (e.g., sheet metal, etc.), aluminum, etc.), plastic, wood, other composite materials etc., for example. Each segment 110, 120 includes an opening (e.g., a slot, a hole, etc.) to allow for adjustment with respect to the third segment 130. Thus, the base of the example adjustable laptop mount 100 can be adjusted using at least a partial overlap of the first segment 110 and the third segment 130 and a partial overlap of the second segment 120 and the third segment 130, for example. A screw, rod, bolt, pin, clamp, etc., can be used to secure a position of the first segment 110 and second segment 120 with respect to the third segment 130, or vice versa, to set a width of the laptop mount base, which can be adjusted to accommodate different treadmill sizes/spacing between handles 102, 104, for example. Thus, the adjustable laptop mount 100 can be adjustable to fit a variety of treadmill and/or other exercise equipment sizes, for example.

The first end of the first segment 110 includes a first attachment mechanism 112. In certain examples, the first attachment mechanism 112 includes a strap, clamp, wrap, and/or other mounting device. The second end of the second segment 120 includes a second attachment mechanism 122. In some examples, the second attachment mechanism 122 includes a strap, clamp, wrap, and/or other mounting device. Further, the first attachment mechanism 112 and/or the second attachment mechanism 122 can include and/or be made of hook and loop closures (e.g., VELCRO™). The first attachment mechanism and/or the second attachment mechanism allows the adjustable laptop mount 100 to adjustably attach to a variety of treadmills (e.g., various arm shapes, widths, etc.).

In certain examples, the adjustable laptop mount 100 includes a telescoping base (e.g., the first segment 110, the second segment 120, and the third segment 130). As shown in the example of FIG. 1, the third segment 130 fits inside both the first segment 110 (e.g., the third segment 130 partially overlaps the first segment 110) and the second segment 120 (e.g., the third segment 130 partially overlaps the second segment 120), which are larger with respect to the third segment 130, to slide in and out to adjust a length of the base. The first segment 110, the second segment 120, and the third segment 130 can be removably secured in their respective positions using one or more bolts, screws, pins, etc. The first segment 110 is secured to the third segment 130 by a first base attachment mechanism 132 removably secured to a first threaded retaining component 114. In certain examples, the first base attachment mechanism 132 is inserted to position the first segment 110 with respect to the third segment 130. The second segment 120 is secured to the third segment 130 by a second base attachment mechanism 134 removably secured to a second threaded retaining component 124. In certain examples, the second base attachment mechanism 134 is inserted to position the second segment 120 with respect to the third segment 130. In certain examples, the first base attachment mechanism 132 and/or the second base attachment mechanism 134 is a screw, bolt, rivet, etc. The first base attachment mechanism 132 and/or the second base attachment mechanism 134 can be made out of any suitable metal such as cold roll steel (e.g., sheet metal, etc.), aluminum, etc. Additionally, the first threaded retaining component 114 and/or the second threaded retaining component 124 can be a plate, support, mount, etc. The first base attachment mechanism 132 and the second base attachment mechanism 134 may be unscrewed (e.g., loosened) for position adjustment of the first segment 110 and the second segment 120 with respect to the third segment 130, for example.

In certain examples, the third segment 130 of the adjustable laptop mount 100 is attached to a fourth segment 140. In certain examples, the fourth segment 140 can be metal (e.g., cold roll steel (e.g., sheet metal, etc.), aluminum, etc.), plastic, wood, other composite materials, etc. The fourth segment 140 can be a pole, rod, post, shaft, etc., for example. The fourth segment 140 is attached to the third segment 130 via a clamp 150. The clamp 150 can be metal (e.g., cold roll steel (e.g., sheet metal, etc.), aluminum, etc.). In certain examples, the clamp 150 is attached to a slider 152 associated with the third segment 130. In some examples, the clamp 150 is attached to the slider 152 using a slider attachment mechanism 156. The slider attachment mechanism 156 can be any number of screws, bolts, rivets, etc., for example. The fourth segment 140 is attached to a tray 142. The tray 142 can hold an object (e.g., a laptop, tablet computer, book, notebook, etc.), for example. The tray 142 can be metal (e.g., cold roll steel (e.g., sheet metal, etc.), aluminum, etc.), plastic, wood, other composite materials, etc.

In certain examples, the tray 142 includes an object attachment mechanism 144. In certain examples, the object attachment mechanism 144 can a strap including and/or composed of hook and loop closures (e.g., VELCRO™). The tray 142 can include a plurality of example slots 143. In certain examples, the object attachment mechanism 144 is associated with the tray 142 through the slots 143. The slot(s) 143 can also be used as vents for an object (e.g., a laptop), for example. An object (e.g., laptop, tablet computer, book, etc.) can be placed on the tray 142. In certain examples, the object attachment mechanism 144 can removably secure the object on to the tray 142.

Figure 2:
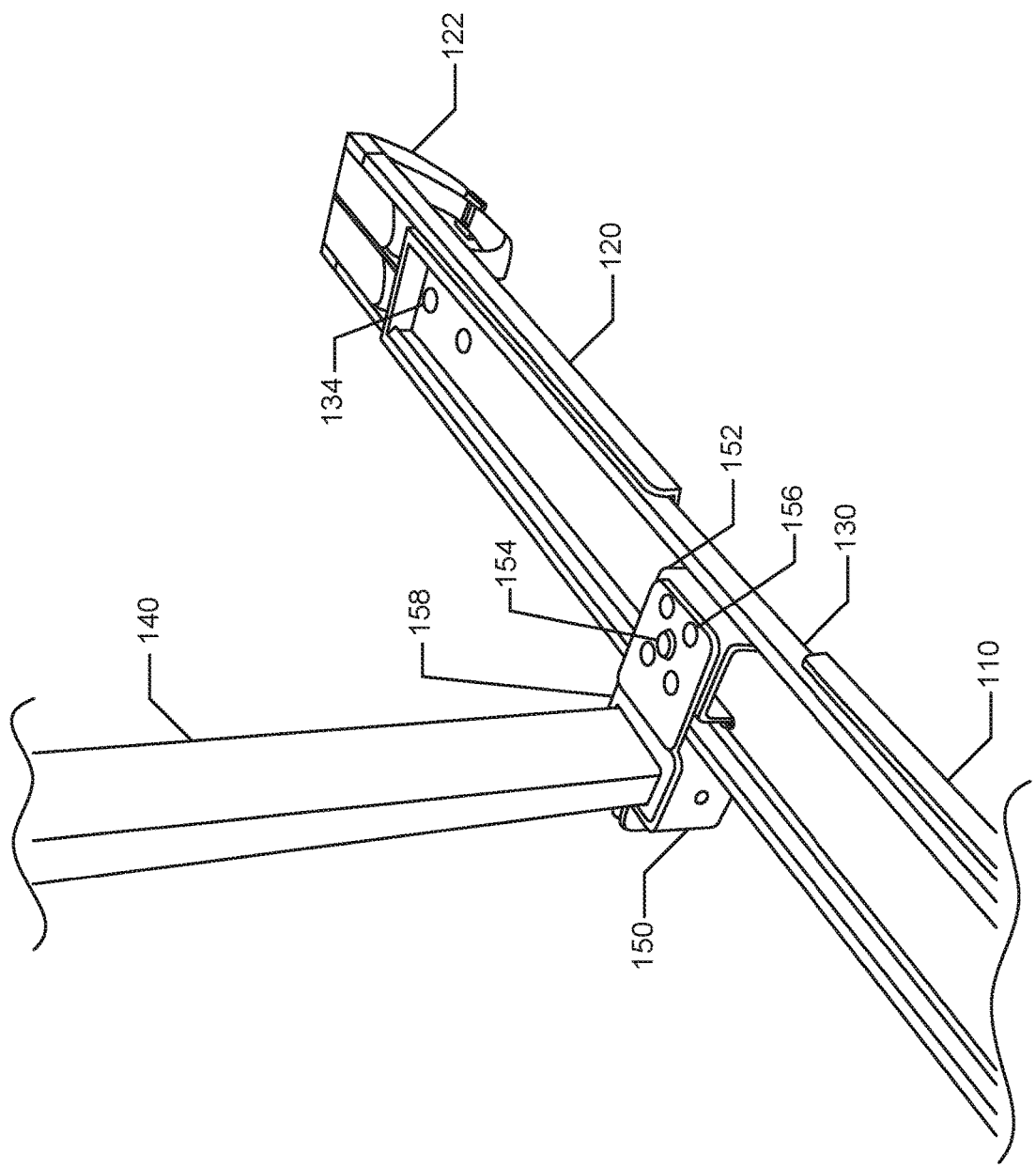
FIGS. 2-11 provide additional views of the adjustable laptop mount of FIG. 1.

FIG. 2 depicts a portion of the example adjustable laptop mount 100 in space without showing its attachment to the handles 102, 104. As shown in the example of FIG. 2, the clamp 150 attaches to the slider 152 via the slider attachment mechanism 156. In certain examples, the slider 152 is positioned in the third segment 130. In the illustrated example of FIG. 2, the third segment 130 is a slider track. A screw 154 can be used to adjust the position of the slider 152 with respect to the third segment 130. In certain examples, the screw 154 associated with both the clamp 150 and slider 152 may be unscrewed to allow the slider 152 to be moved along the sliding track of the third segment 130. The horizontal placement of the slider 152 within the sliding track is limited by the length of the third segment 130. While the slider 152 in the illustrated example of FIG. 2 is located within a slider track of the third segment 130, configurations are not limited thereto. For example, the example slider 152 can be a bracket secured to the outside of the third segment 130 that also allows for horizontal movement. Furthermore, the slider 152 can also include a crank operated screw system to allow for horizontal adjustment of the slider 152 along the third segment 130.

Figure 3:
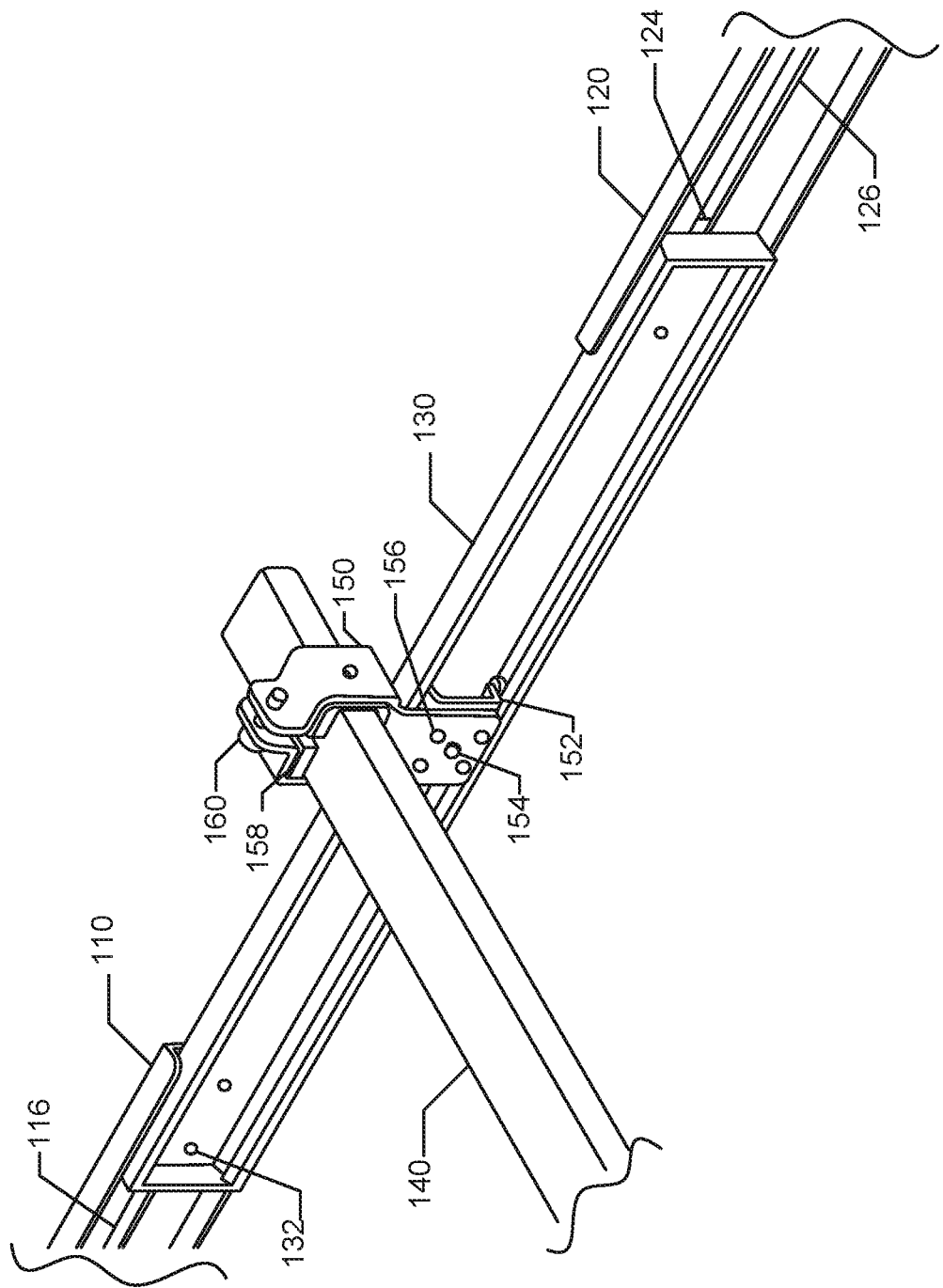

FIG. 3 illustrates an additional view of the adjustable laptop mount 100. That is, FIG. 3 provides an example back view of the adjustable laptop mount 100. The example fourth segment 140 is associated with the base of the adjustable laptop mount 100 (e.g., the interconnected combination of the first segment 110, the second segment 120, and the third segment 130) via the clamp 150. The clamp 150 is secured to the slider 152 at a fixed height (e.g., based on or corresponding to the placement of the third segment 130). Additionally, the clamp 150 includes an inner sleeve 158, which increases grip and decreases potential damage to the fourth segment 140 due to vertical sliding motion through the clamp 150. In certain examples, the inner sleeve 158 is a plastic sleeve.

In the illustrated example of FIG. 3, the fourth segment 140 slides through the clamp 150 to adjust the height of the tray 142. The clamp 150 secures the height of the fourth segment 140 with a clamp attachment mechanism 160 (e.g., to provide 3-4 inches of surface pressure in the clamp 150 to help ensure that the fourth segment 140 does not move). The clamp attachment mechanism 160 can be a bolt, pin, screw, etc., for example. In some examples, the height of the tray 142 is adjusted by sliding the clamp 150 along a fixed fourth segment 140. The illustrated example of the fourth segment 140 in FIGS. 1-11 is a single segment. In other examples, the fourth segment 140 includes gas spring(s) with a release button, allowing height adjustment of the tray 142 via the fourth segment 140 itself (e.g., telescoping motion of the fourth segments 140). In further examples, the fourth segment 140 includes a plurality of holes at fixed distances (e.g., 1 inch, 2 inches, etc.) along its length and is secured to clamp 150 with the clamp attachment mechanism 160 (e.g., a spring locking pin). Thus, the fourth segment 140 may be adjusted at fixed heights according to the holes at fixed distances along the fourth segment 140. Additionally or alternatively, other examples of height adjustment for the adjustable laptop mount 100 include a scissor lift arm for the fourth segment 140 and/or a crank operated rack and pinion gear system for the clamp 150.

Furthermore, in the illustrated example of FIG. 3, the first segment 110 and the second segment 120 are in extended positions (e.g., are both extended toward the respective ends of the third segment 130, etc.) with respect to the third segment 130. The base of the adjustable laptop mount 100 can be adjusted (e.g., wider, narrower) by extending one and/or both of the first segment 110 and the second segment 120, for example. The first segment 110 can be adjusted with respect to the third segment 130 after loosening the first base attachment mechanism 132, for example. The positioning of the first segment 110 is limited by the length of a first slot 116 in the first segment 110. Similarly, the second segment 120 can be adjusted with respect to the third segment 130 after loosening the second base attachment mechanism 134 (not pictured). The positioning of the second segment 120 is limited by the length of a second slot 126 in the second segment 120.

Figure 4:
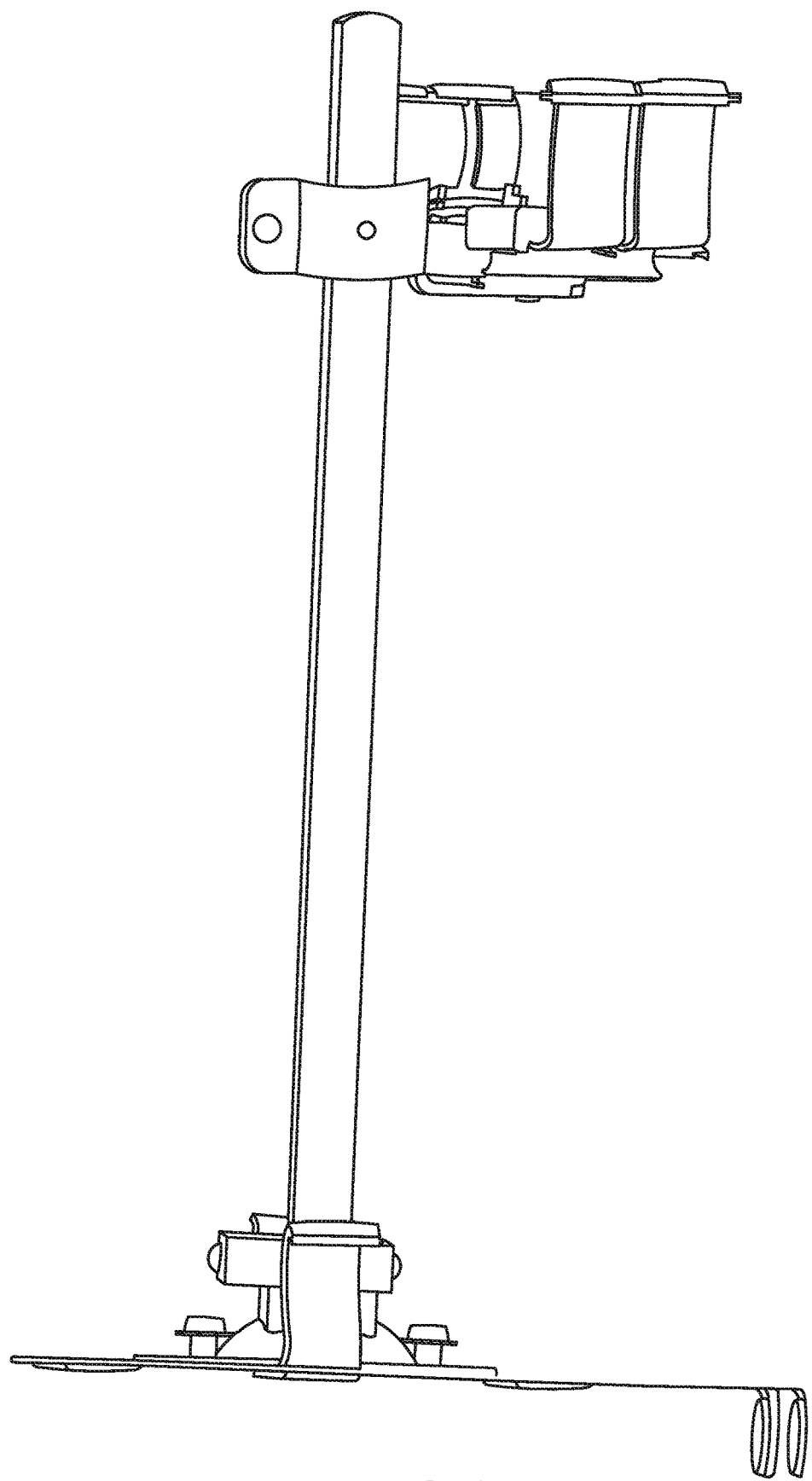
Figure 5:
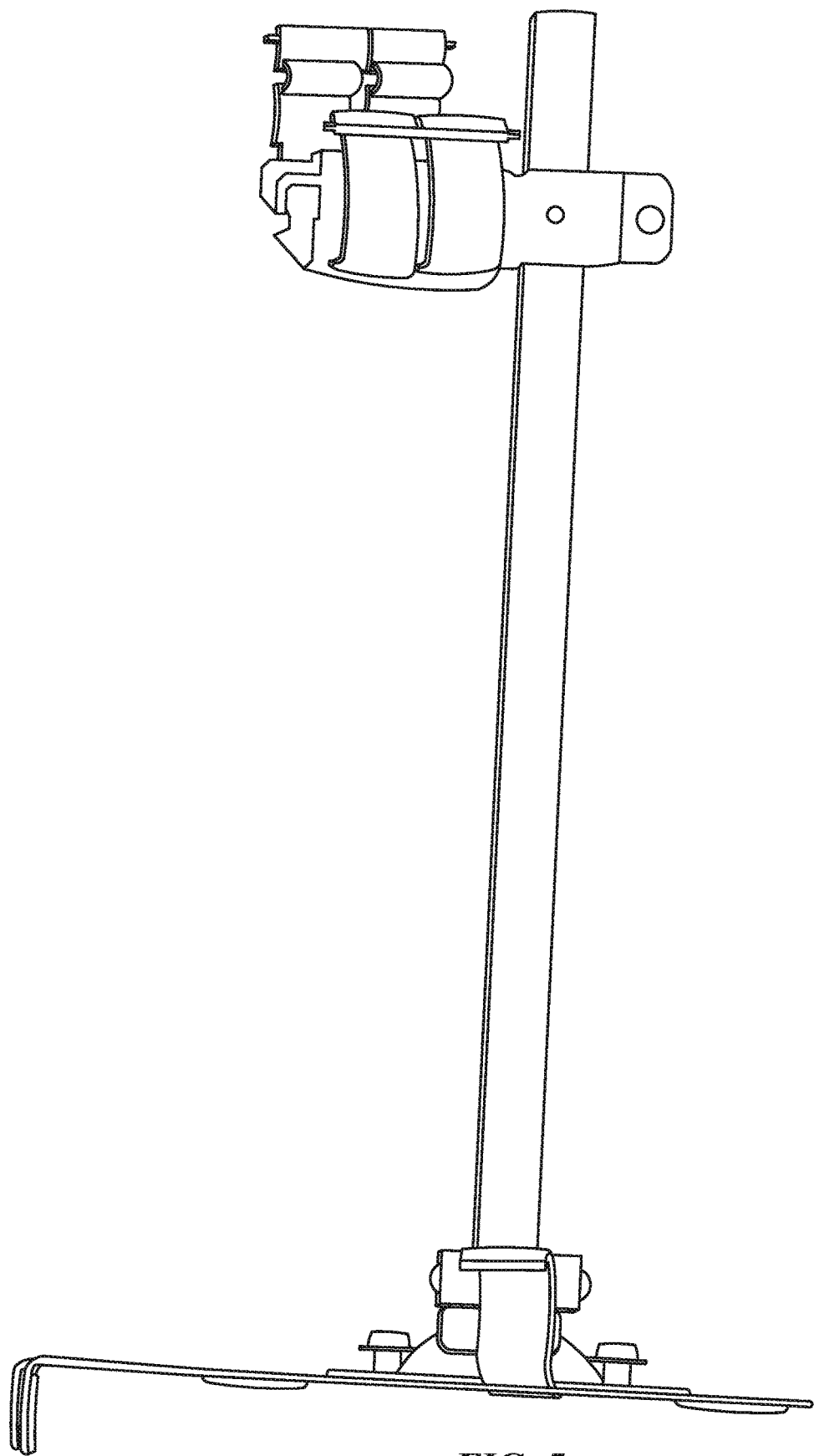
Figure 6:
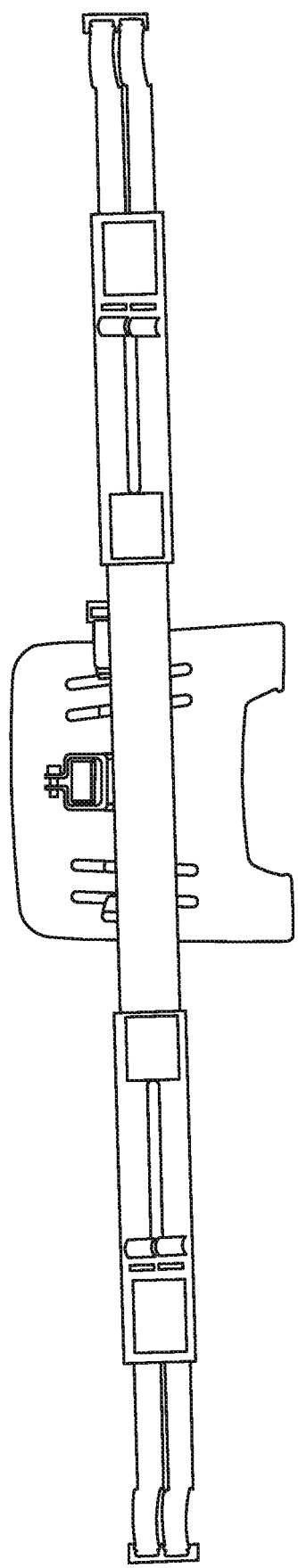

FIGS. 4-11 provide additional views of the adjustable laptop mount 100 shown and described with respect to FIGS. 1-3. For example, FIGS. 4-5 show example side views of the adjustable laptop mount 100. FIG. 6 shows an example bottom view of the example adjustable laptop mount 100.

Figure 7:
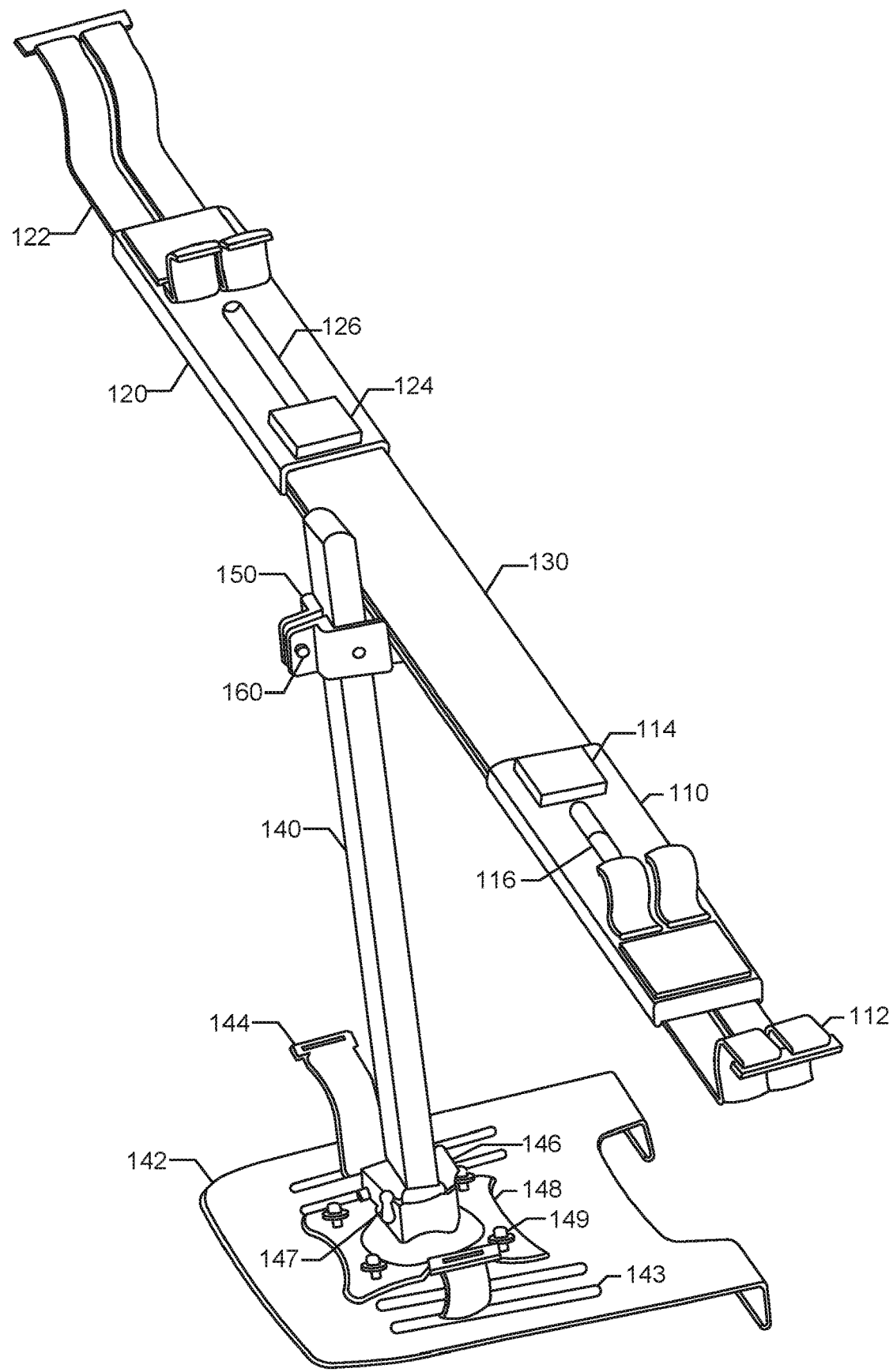

FIG. 7 provides an example perspective view of the example adjustable laptop mount 100. In certain examples, the fourth segment 140 is connected to a joint 146. The joint 146 can be a tilt hinge, for example. The joint 146 can be metal (e.g., cold roll steel (e.g., sheet metal, etc.), aluminum, etc.), plastic, wood, other composite materials, etc. The joint 146 includes a joint adjustment mechanism 147. The joint adjustment mechanism 147 can be a pin, bolt, screw, etc., for example. In certain examples, the tray 142 can be tilted up, tilted down, etc., using the joint 146 and the joint attachment mechanism 147. Further, the joint 146 can be a free moving cup joint and the tray 142 can be adjusted and/or rotated (e.g., left, right, forward, back, etc.). The joint 146 can be attached to a plate 148 using any suitable method (e.g., welding, removably secured and/or attached via latch or fastener system, etc.). The plate 148 can be metal (e.g., cold roll steel (e.g., sheet metal, etc.), aluminum, etc.), plastic, wood, other composite materials, etc. In certain examples, the plate 148 can be attached to the tray 142 using a plurality of plate attachment mechanisms 149. The plate attachment mechanisms 149 can be screws, pins, bolts, etc., for example.

Figure 8:
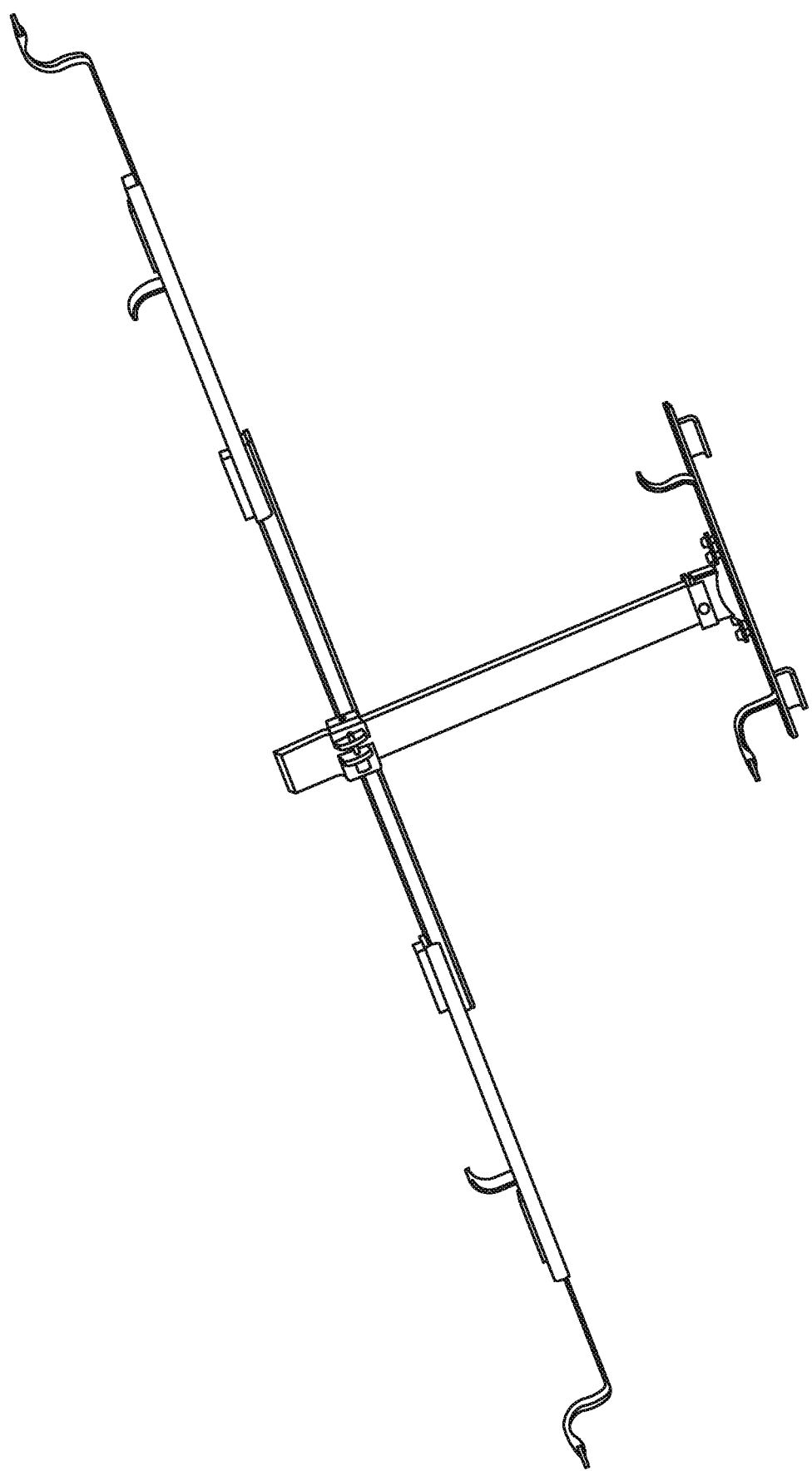
Figure 9:
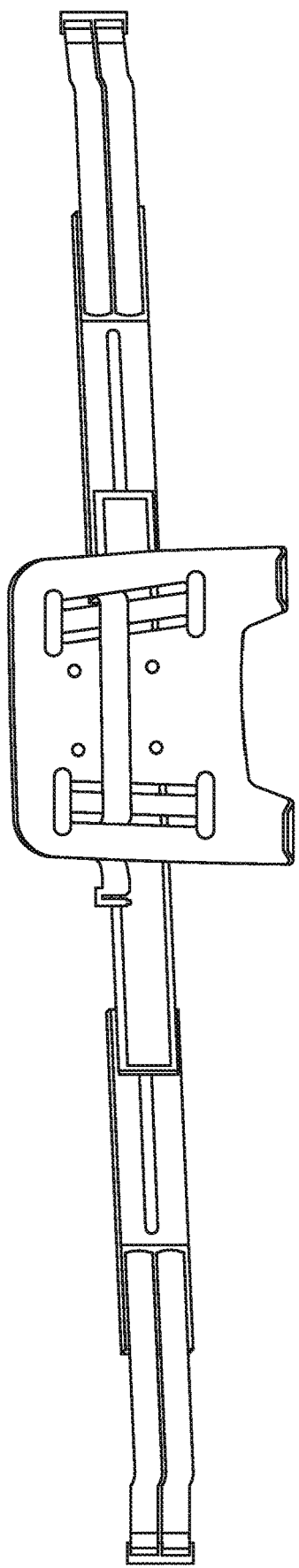
Figure 10:
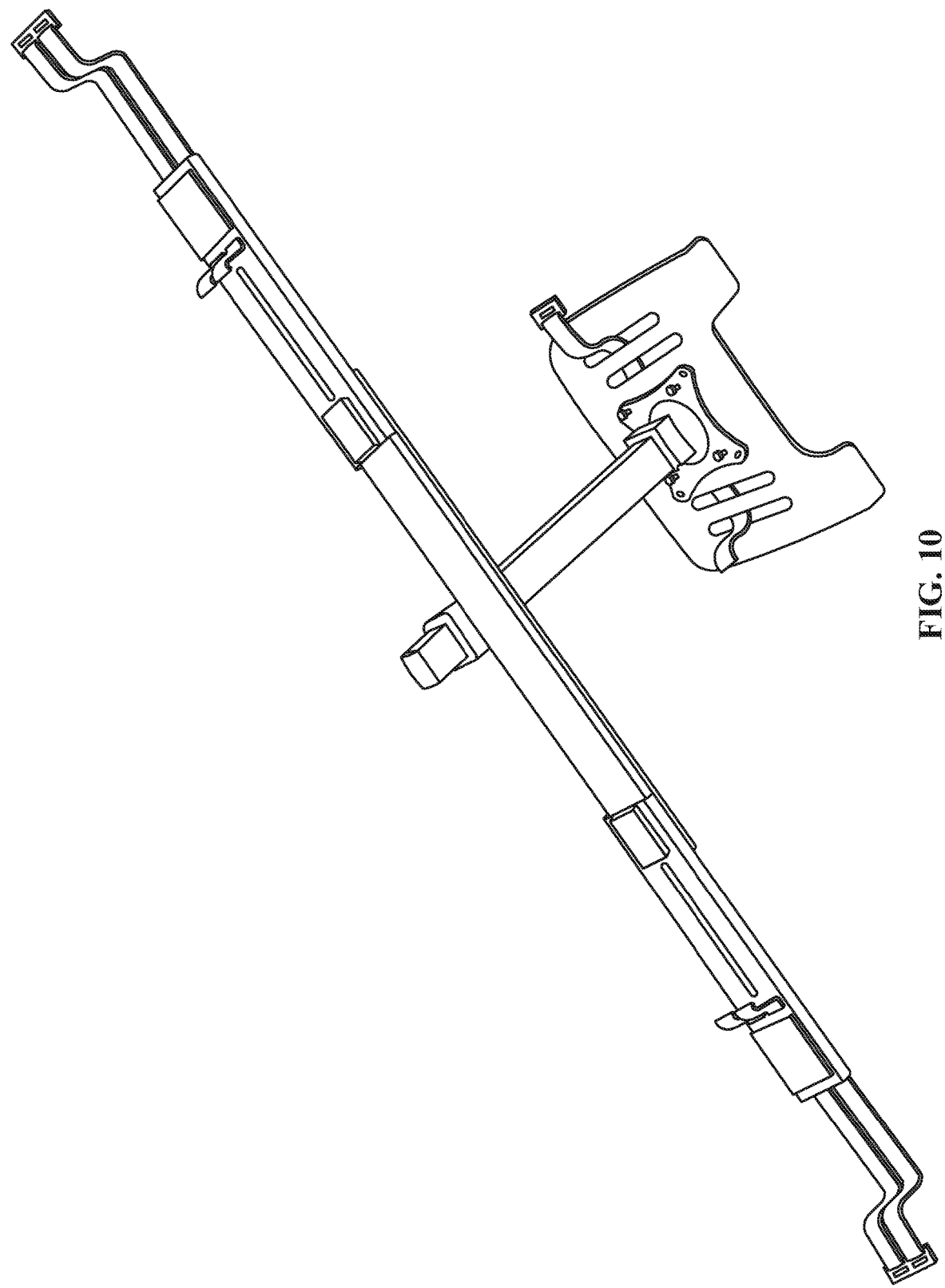
Figure 11:
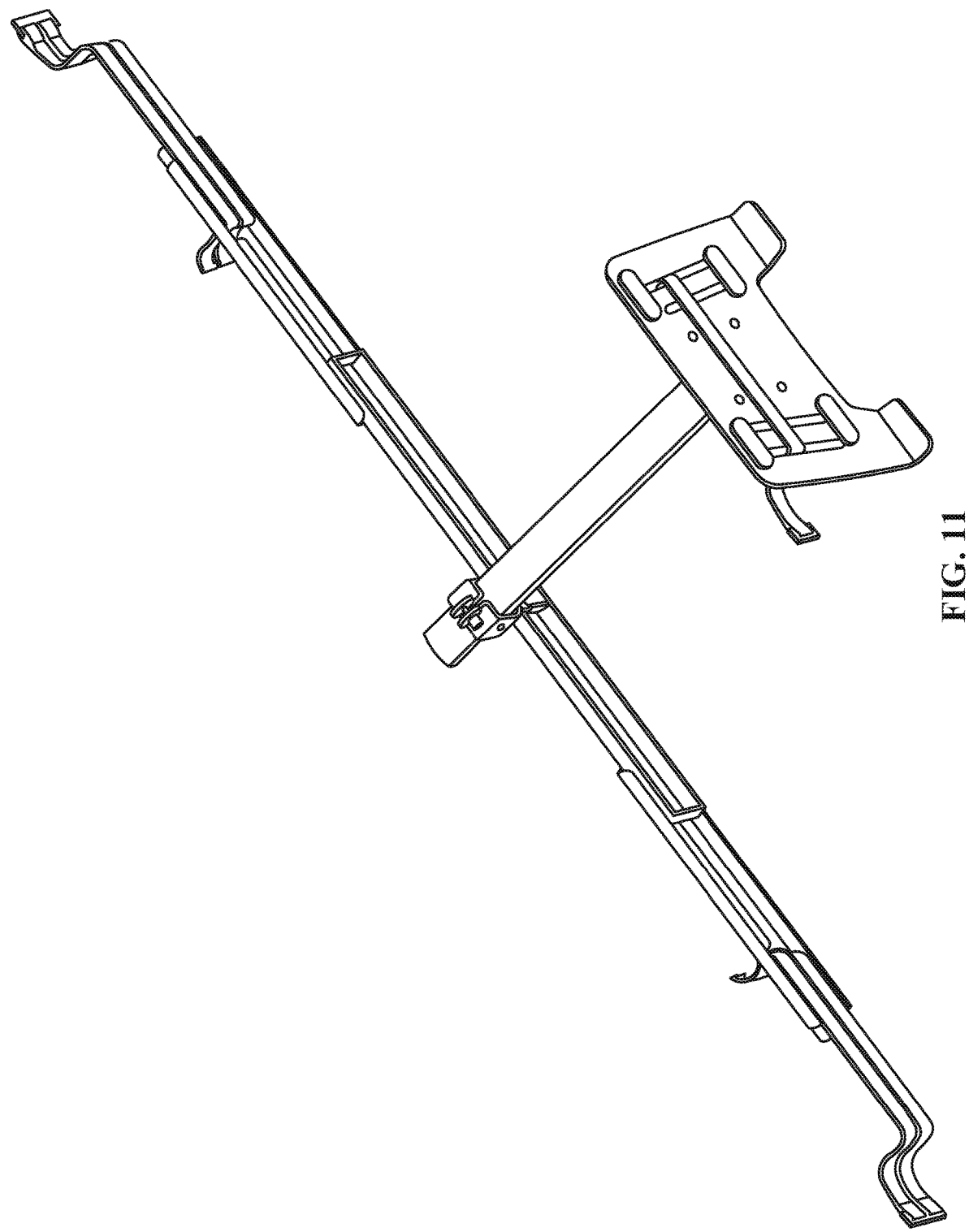

FIG. 8 provides an example back view of the adjustable laptop mount 100. FIG. 9 shows an example top view of the adjustable laptop mount 100. FIG. 10 provides an example perspective front view of the adjustable laptop mount 100. FIG. 11 provides an example perspective back view of the adjustable laptop mount 100.

Example Methods of Manufacture

Figure 12:
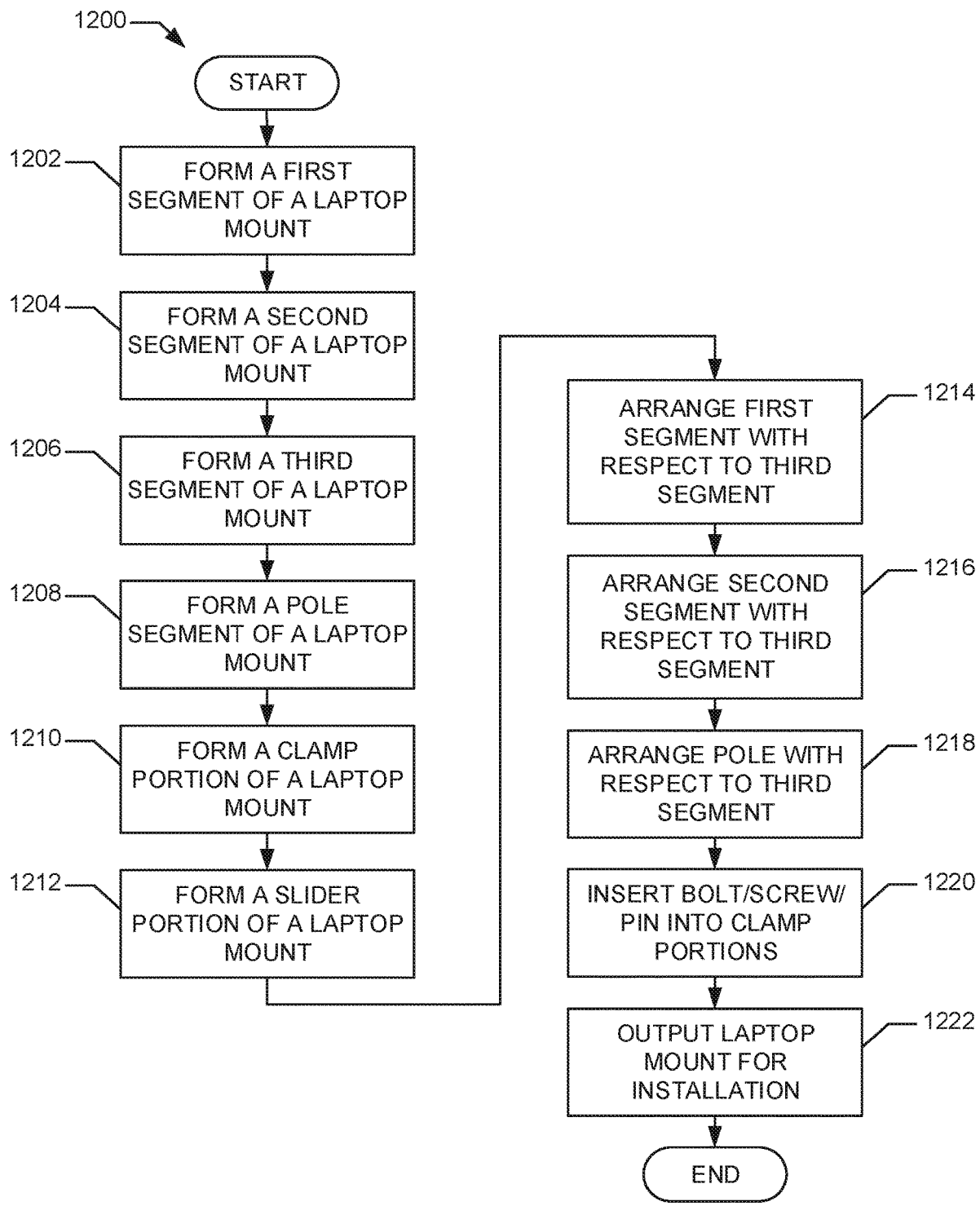
FIG. 12 illustrates a flow diagram of an example method of manufacturing and/or otherwise forming the adjustable laptop mount of FIGS. 1-11.

FIG. 12 illustrates a flow diagram of an example method 1200 of manufacturing and/or otherwise forming the adjustable laptop mount 100. The adjustable laptop mount 100 can be formed via one or more manufacturing processes such as mold casting, slush casting, sheet metal molding, computer numerical control (CNC) machining, turning, sand casting, investment casting, die casting, etc. While examples above discuss the adjustable laptop mount 100 as made of metal, in certain examples, the adjustable laptop mount 100 can be formed from plastic and/or other composite material formed from injection molding, thermoforming, rotomoting, CNC machining, etc.

At block 1202, the first segment 110 of the adjustable laptop mount 100 is formed. For example, a length, width, and depth of the first segment 110 is defined, and the first slot 116 is formed in the first segment 110 to allow for adjustability of the first segment 110 in the adjustable laptop mount 100. The first segment 110 can be formed from a rigid material (e.g., spring steel, mild steel, aluminum, etc.) sufficient to support weight from the fourth segment 140, tray 142, and/or object (e.g., a laptop, book, etc.), for example. In certain examples, the material (e.g., metal, composite, plastic, etc.) used to form the first segment 110 can be treated, such as with paint, rust inhibitor, etc.

At block 1204, the second segment 120 of the adjustable laptop mount 100 is formed. For example, a length, width, and depth of the second segment 120 is defined, and the second slot 126 is formed in the second segment 120 to allow for adjustability of the second segment 120 with respect to the third segment 130. The second segment 120 can be formed from a rigid material (e.g., spring steel, mild steel, aluminum, etc.) sufficient to support weight from the fourth segment 140, tray 142, and/or object (e.g., laptop, book, etc.), for example. In certain examples, the material (e.g., metal, composite, plastic, etc.) used to form the second segment 120 can be treated, such as with paint, rust inhibitor, etc.

At block 1206, the third segment 130 of the adjustable laptop mount 100 is formed. For example, a length, width, and depth of the third segment 130 is defined. Additionally, a slider track is formed in the third segment 130 to allow for horizontal adjustment of the slider 152. The third segment 130 can be formed from a rigid material (e.g., spring steel, mild steel, aluminum, etc.) sufficient to support weight from the fourth segment 140, tray 142, and/or object (e.g., laptop, book, etc.), for example. In certain examples, the material (e.g., metal, composite, plastic, etc.) used to form the third segment 130 can be treated, such as with paint, rust inhibitor, etc.

At block 1208, the fourth segment 140 of the adjustable laptop mount 100 is formed. For example, a length, width, and depth of the fourth segment 140 is defined. In some examples, holes at predefined intervals (e.g., 1 inch, 2 inches, etc.) are formed in the fourth segment 140 to allow for adjustability of the fourth segment 140 with respect to the third segment 130 to define a height of the adjustable laptop mount 100.

At block 1210, the clamp 150 of the adjustable laptop mount 100 is formed such as through bending and/or fusing of metal segments to enable positioning and tightening of the clamp 150 with respect to the fourth segment 140. At block 1212, the slider 152 of the adjustable laptop mount 100 is formed such as through bending and/or fusing of metal segments to enable horizontal positioning of the slider 152 with respect to the third segment 130.

At block 1214, the first segment 110 is arranged with respect to the third segment 130. For example, the third segment 130 can be slid and/or otherwise positioned over the first segment 110, or vice versa. The position of the first segment 110 with respect to the third segment 130 can be removably secured with the first base attachment mechanism 132 (e.g., one or more screws, bolts, etc.) through the first slot 116 secured to the first threaded retaining component 114. For example, the first base attachment mechanism 132 can be tightened but is able to be loosened, allowing the first segment 110 to move with respect to the third segment 130.

At block 1216, the second segment 120 is arranged with respect to the third segment 130. For example, the third segment 130 can be slid and/or otherwise positioned over the second segment 120, or vice versa. The position of the second segment 120 with respect to the third segment 130 can be removably secured with the second base attachment mechanism 134 (e.g., one or more screws, bolts, etc.) through the second slot 126 secured to the second threaded retaining component 124. For example, the second base attachment mechanism 134 can be tightened but is able to be loosened, allowing the second segment 120 to move with respect to the third segment 130.

At block 1218, the fourth segment 140 is arranged with respect to the third segment 130. For example, the fourth segment 140 can be slid and/or otherwise positioned within the clamp 150. The position of the fourth segment 140 with respect to the third segment 130 can be removably secured with the clamp attachment mechanism (e.g., bolt, screw, pin, etc.) 160 in clamp 150. For example, the clamp attachment mechanism 160 can be both tightened and loosened, allowing the fourth segment 140 to slide through the clamp 150.

At block 1220, the first base attachment mechanism 132 and/or the second base attachment mechanism 134 are inserted in the third segment 130. For example, the segment 130 can be formed at block 1206 such as shown in one or more of FIGS. 1-11. The first base attachment mechanism 132 and the second base attachment mechanism 134 can be inserted to removably affix the third segment 130 to the first segment 110 and the second segment 120 and enable adjustment to fine tune positioning of the adjustable laptop mount 100 base with respect to handles 102, 104, for example. The clamp attachment mechanism 160 can be inserted into the clamp 150 to removably affix the fourth segment 140 to the clamp 150 and enable adjustment of the tray 142 height.

At block 1222, the adjustable laptop mount 100 is output for installation, other use, etc. For example, the adjustable laptop mount 100 can be packaged and sold, shipped, displayed, etc., for purchase, use, etc.

While an example implementation of the method 1200 of manufacturing the adjustable laptop mount 100 is disclosed and described above, one or more of the elements, processes and/or devices illustrated in FIG. 12 can be combined, divided, re-arranged, omitted, eliminated and/or implemented in any other way.

Example Methods of Configuration

Figure 13:
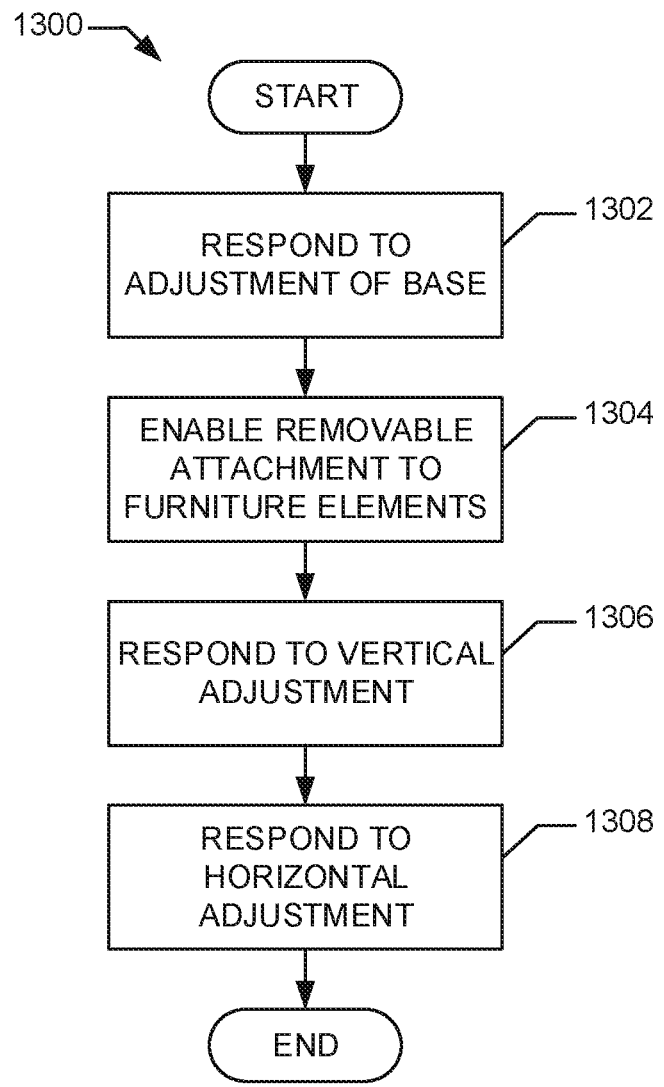
FIG. 13 illustrates a flow diagram of an example method of configuring the adjustable laptop mount of FIGS. 1-11.

FIG. 13 illustrates a flow diagram of an example method 1300 to configure (e.g., adjust, attach, etc.) the adjustable laptop mount 100 to exercise equipment (e.g., a treadmill, elliptical, other device, etc.).

At block 1302, the base of the adjustable laptop mount 100 responds to adjustment with respect to the width of the treadmill, stair climber, etc. In certain examples, one and/or both the first segment 110 and the second segment 120 are adjusted with respect to the third segment 130. For example, a user can unscrew (e.g., loosen) the first base attachment mechanism 132 and/or the second base attachment mechanism 134. In certain examples, the first segment 110 and/or the second segment 120 can be adjusted with respect to the third segment 130. Further, the position of the first segment 110 and/or the second segment 120 can be limited by the first slot 116 and/or the second slot 126. A user can screw in (e.g., tighten) the first base attachment mechanism 132 and/or the second base attachment mechanism 134 to maintain the position of the first segment 110 and/or the second segment 120 with respect to the third segment 130. The adjustable laptop mount 100 is then configured for installation according to one or more of these adjustments.

At block 1304, the adjustable laptop mount 100 enables removable attachment to furniture elements, such as the handles of the treadmill, stair climber, etc. The first attachment mechanism 112 and the second attachment mechanism 122 are secured around handles 102 and 104, for example. In certain examples, the first attachment mechanism 112 and the second attachment mechanism 122 are secured around handles 102 and 104 using hook and loop closures (e.g., VELCRO™).

At block 1306, the vertical position (e.g., height) of the tray 142 responds to adjustment. For example, the clamp attachment mechanism 160 is unscrewed (e.g., loosened) and the fourth segment 140 is slid through the clamp 150. In certain examples, a user can adjust the tray 142 to predefined heights with respect to the third segment 130 according to holes in the fourth segment 140. A user can tighten clamp 150 (e.g., tighten the clamp attachment mechanism 160) around the fourth segment 140 to maintain a desired height (e.g., position of the fourth segment 140 with respect to the third segment 130) of tray 142.

At block 1308, the horizontal position of the tray 142 responds to adjustment. For example, the screw 154 is unscrewed (e.g., loosened). The slider 152 can be positioned along the slider track of the third segment 130. In certain examples, a user can tighten screw 154 to secure the horizontal position of the slider 152 (e.g., the tray 142).

Once positioned and secured, an object can be placed on and/or secured to tray 142. The object can be a laptop, tablet computer, book, etc., for example. In certain examples, the object can be secured to the tray 142 with the object attachment mechanism (e.g., a strap, etc.) 144. The object attachment mechanism 144 can use hook and loop closures (e.g., VELCRO™), for example. In certain examples, the tray 142 can also be adjusted (e.g., tilted up, tilted down, etc.) using the joint attachment mechanism 147. A user can begin using the adjustable laptop mount 100 and/or treadmill, elliptical, etc. In certain examples, a user can walk, run, jog, etc. while reading, typing, writing, etc. on the object in the tray 142. Further, a user can begin using the equipment (e.g., treadmill, stair climber, etc.) before the adjustable laptop mount 100 is adjusted (e.g., begin using the equipment before block 1306). Additionally, a user can readjust (e.g., repeat blocks 1306 and 1308) while using a treadmill, elliptical, etc.

While an example implementation of the method 1300 of configuring the adjustable laptop mount 100 is illustrated in FIG. 13, one or more of the elements, processes and/or devices illustrated in FIG. 13 may be combined, divided, re-arranged, omitted, eliminated and/or implemented in any other way.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Thus, certain examples provide an adjustable laptop mount including: a first segment having a first end and a second end; a second segment having a first end and a second end; a third segment having a first end and a second end, the first end of the third segment to at least partially overlap the second end of the first segment and the second end of the third segment to at least partially overlap the first end of the second segment; a first attachment mechanism at the first end of the first segment to removably affix the first segment to a first furniture element; a second attachment mechanism at the second end of the second segment to removably affix the second segment to a second furniture element; a fourth segment having a first end and a second end, the second end of the fourth segment to attach to a tray; and a clamp at the third segment to removably affix the fourth segment to the third segment.

Certain examples provide a method of manufacturing an adjustable laptop mount. The example method includes forming a first segment having a first end and a second end. The example method includes forming a second segment having a first end and a second end. The example method includes forming a third segment having a first end and a second end, the first end of the third segment to at least partially overlap the second end of the first segment and the second end of the third segment to at least partially overlap the first end of the second segment. The example method includes forming a first attachment mechanism at the end of the second segment to removably affix the first segment to a first furniture element. The example method includes forming a second attachment mechanism at the end of the second segment to removably affix the second segment to a second furniture element. The example method includes forming a fourth segment having a first end and a second end, the second end of the fourth segment to attach to a tray. The example method includes forming a clamp at the third segment to removably affix the fourth segment to the third segment. The example method includes outputting the adjustable laptop mount.

Certain examples provide an adjustable laptop mount apparatus including: first means for attaching a first segment with respect to a third segment, the first means for attaching a first segment to a third segment to include an opening in the first segment through which at least one of a screw, bolt, or pin is inserted to position the first segment with respect to the third segment; second means for attaching a second segment with respect to the third segment, the second means for attaching a second segment to a third segment to include an opening in the second segment through which at least one of a screw, bolt, or pin is inserted to position the second segment with respect to the third segment; first means for attaching a first segment to a first furniture element; and second means for attaching a second segment to a second furniture element.

From the foregoing, it will be appreciated that example methods, apparatus and articles of manufacture have been disclosed that provide a new laptop mount that can be positioned to support a laptop on a treadmill, elliptical, etc. The disclosed methods, apparatus and articles of manufacture improve existing portable workstations by increasing usability for a variety of equipment handle widths and shapes and improving laptop horizontal and vertical placement by a user. The disclosed apparatus, articles, of manufacture, methods, etc., provide an adjustable laptop mount with both gross adjustment (e.g., positioning of multiple segments with respect to each other to define the width and height of the laptop mount, etc.) and fine adjustment (e.g., adjusting the strap mechanism to help ensure secure, stable, fitted attachment of the base between handles of a treadmill, elliptical, etc.).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An adjustable laptop mount comprising:
   a first segment having a first end and a second end;
   a second segment having a first end and a second end;
   a third segment having a first end and a second end, the first end of the third segment to at least partially overlap the second end of the first segment and the second end of the third segment to at least partially overlap the first end of the second segment;
   a first attachment mechanism at the first end of the first segment to removably affix the first segment to a first furniture element;
   a second attachment mechanism at the second end of the second segment to removably affix the second segment to a second furniture element;
   a fourth segment having a first end and a second end, the second end of the fourth segment to attach to a tray; and
   a clamp at the third segment to removably affix the fourth segment to the third segment.

2. The adjustable laptop mount of claim 1, further including a first base attachment mechanism to position the first segment with respect to the third segment.

3. The adjustable laptop mount of claim 2, wherein the first base attachment mechanism is to include an opening in the first segment through which at least one of a screw, bolt, or pin is inserted to position the first segment with respect to the third segment.

4. The adjustable laptop mount of claim 1, further including a second base attachment mechanism to position the second segment with respect to the third segment.

5. The adjustable laptop mount of claim 4, wherein the second base attachment mechanism is to include an opening in the second segment through which at least one of a screw, bolt, or pin is inserted to position the second segment with respect to the third segment.

6. The adjustable laptop mount of claim 1, wherein the third segment is to include a slider track.

7. The adjustable laptop mount of claim 6, further including a slider associated with the third segment.

8. The adjustable laptop mount of claim 7, wherein the slider includes a slider attachment mechanism to position the slider with respect to the clamp at the third segment.

9. The adjustable laptop mount of claim 7, wherein the slider is to be associated with the slider track of the third segment.

10. The adjustable laptop mount of claim 1, wherein the overlap of the third segment and the first segment is adjustable to adjust a length of the laptop mount, and the overlap of the third segment and the second segment is adjustable to adjust a length of the laptop mount.

11. The adjustable laptop mount of claim 1, wherein at least one of the first segment, second segment, third segment, or fourth segment is formed of metal.

12. The adjustable laptop mount of claim 1, wherein at least one of the first attachment mechanism or second attachment mechanism includes or is made of hook and loop closures.

13. The adjustable laptop mount of claim 12, wherein the clamp at the third segment includes at least one bolt.

14. The adjustable laptop mount of claim 1, wherein the clamp at the third segment is at least one of a clamp with an inner sleeve, a gas spring, or crank operated rack and pinion gear system.

15. The adjustable laptop mount of claim 1, wherein the fourth segment is at least one of a pole, a pole with a plurality of holes, or a scissor lift arm.

16. The adjustable laptop mount of claim 1, wherein the first furniture element includes a first exercise equipment arm, and wherein the second furniture element includes a second exercise equipment arm.

17. A method of manufacturing an adjustable laptop mount, the method comprising:
    forming a first segment having a first end and a second end;
    forming a second segment having a first end and a second end;
    forming a third segment having a first end and a second end, the first end of the third segment to at least partially overlap the second end of the first segment and the second end of the third segment to at least partially overlap the first end of the second segment;
    forming a first attachment mechanism at the first end of the first segment to removably affix the first segment to a first furniture element;
    forming a second attachment mechanism at the second end of the second segment to removably affix the second segment to a second furniture element;
    forming a fourth segment having a first end and a second end, the second end of the fourth segment to attach to a tray;
    forming a clamp at the third segment to removably affix the fourth segment to the third segment; and
    outputting the adjustable laptop mount.

18. The method of claim 17, further including forming a first base attachment mechanism to position the first segment with respect to the third segment.

19. The method of claim 17, further including forming a second base attachment mechanism to position the second segment with respect to the third segment.

20. An adjustable laptop mount apparatus comprising:
    first means for attaching a first segment with respect to a third segment, the first means for attaching the first segment to the third segment to include an opening in the first segment through which at least one of a screw, bolt, or pin is inserted to position the first segment with respect to the third segment;

second means for attaching a second segment with respect to the third segment, the second means for attaching the second segment to the third segment to include an opening in the second segment through which at least one of a screw, bolt, or pin is inserted to position the second segment with respect to the third segment;

first means for attaching the first segment to a first furniture element; and second means for attaching the second segment to a second furniture element.

* * * * *